(12) United States Patent
Majestic et al.

(10) Patent No.: US 9,908,718 B2
(45) Date of Patent: Mar. 6, 2018

(54) DEVICE, SYSTEM, AND METHOD FOR LIFTING AND MOVING FORMABLE AND/OR COLLAPSIBLE PARTS

(71) Applicant: Dow Global Technologies LLC, Midland, MI (US)

(72) Inventors: Mark J. Majestic, Midland, MI (US); James R. Ogle, Sanford, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 287 days.

(21) Appl. No.: 14/427,074

(22) PCT Filed: Mar. 6, 2013

(86) PCT No.: PCT/US2013/029318
§ 371 (c)(1),
(2) Date: Mar. 10, 2015

(87) PCT Pub. No.: WO2014/062215
PCT Pub. Date: Apr. 24, 2014

(65) Prior Publication Data
US 2015/0239680 A1     Aug. 27, 2015

Related U.S. Application Data

(60) Provisional application No. 61/716,158, filed on Oct. 19, 2012.

(51) Int. Cl.
*B65G 47/91* (2006.01)
*B28B 11/16* (2006.01)
(Continued)

(52) U.S. Cl.
CPC .......... *B65G 47/91* (2013.01); *B25J 15/0691* (2013.01); *B28B 3/269* (2013.01); *B28B 11/16* (2013.01);
(Continued)

(58) Field of Classification Search
CPC ...... B65G 47/91; B25J 15/0691; B28B 3/269; B28B 11/16; B28B 13/04; B28B 17/0036; B29C 47/0019; B29C 47/34
(Continued)

(56) References Cited

U.S. PATENT DOCUMENTS 4,948,766 A    8/1990 Talmy et al.
5,173,349 A    12/1992 Yavuz et al.
(Continued)

FOREIGN PATENT DOCUMENTS

CH        682072 A5    7/1993
DE     10245716 A1    3/2004
(Continued)

OTHER PUBLICATIONS

Reed, J., Introduction to the Principles of Ceramic Processing, Wiley Interscience, 1988, Chapters 20-21, Part 1, pp. 329-372 and Part 2, pp. 373-379.
(Continued)

*Primary Examiner* — Nahida Sultana
(74) *Attorney, Agent, or Firm* — The Dobrusin Law Firm, P.C.

(57) ABSTRACT

Device and process for picking up a formable and/or collapsible part (30) that employs the forces of a vacuum (44) and generally distributes the vacuum force uniformly over a large portion of the surface of the part (30). The device preferably provides support for the part (30) at regular intervals, for example using a distributor plate (14) having many small openings (26). The device preferably employs a porous layer (12) such as an open cell foam between the distributor plate (14) and the part (30). The porous layer (12) may perform for one or any combination of the following:
(Continued)

further distribute the vacuum forces, cushion the part (30) against the distributor plate (14), or further distribute the support for the part (30).

18 Claims, 4 Drawing Sheets

(51) Int. Cl.
B29C 47/00 (2006.01)
B28B 13/04 (2006.01)
B29C 47/34 (2006.01)
B25J 15/06 (2006.01)
B28B 3/26 (2006.01)
B28B 17/00 (2006.01)

(52) U.S. Cl.
CPC .......... *B28B 13/04* (2013.01); *B28B 17/0036* (2013.01); *B29C 47/0019* (2013.01); *B29C 47/0021* (2013.01); *B29C 47/34* (2013.01)

(58) Field of Classification Search
USPC ....................................................... 264/148
See application file for complete search history.

(56) References Cited

U.S. PATENT DOCUMENTS

| | | | | |
|---|---|---|---|---|
| 6,147,001 | A * | 11/2000 | Kimura | B24B 37/30 257/E21.244 |
| 6,582,796 | B1 | 6/2003 | Joulin et al. | |
| 6,669,751 | B1 | 12/2003 | Ohno et al. | |
| 6,797,666 | B2 | 9/2004 | Harada et al. | |
| 6,953,554 | B2 | 10/2005 | Wallin et al. | |
| 7,485,594 | B2 | 2/2009 | Saha et al. | |
| 9,457,478 | B2 * | 10/2016 | Harter | B65G 47/91 |
| 9,573,280 | B2 * | 2/2017 | Harter | B65G 47/91 |
| 2002/0017365 | A1 * | 2/2002 | Gunji | B24B 37/30 156/345.12 |
| 2004/0020359 | A1 | 2/2004 | Koermer et al. | |
| 2004/0238121 | A1 * | 12/2004 | Masumura | B24B 37/30 156/345.12 |
| 2007/0062000 | A1 * | 3/2007 | Murphy | A47L 5/24 15/403 |
| 2007/0180648 | A1 * | 8/2007 | Andrup | A47L 9/02 15/339 |
| 2008/0089772 | A1 | 4/2008 | Mueller-Hummel | |
| 2014/0183154 | A1 * | 7/2014 | Essebaggers | B65D 47/32 215/311 |
| 2016/0067867 | A1 * | 3/2016 | Harter | B65G 47/91 294/188 |
| 2016/0128528 | A1 * | 5/2016 | Stewen | A47L 1/05 15/344 |
| 2016/0332310 | A1 * | 11/2016 | Regan | B25J 15/0675 |
| 2016/0355283 | A1 * | 12/2016 | Capitani | B65B 31/028 |
| 2017/0036247 | A1 * | 2/2017 | Hoshikawa | B08B 3/02 |

FOREIGN PATENT DOCUMENTS

| | | |
|---|---|---|
| DE | 102004016637 A1 | 10/2005 |
| EP | 0260128 A2 | 3/1988 |
| EP | 1832535 A1 | 9/2007 |
| EP | 1916206 A1 | 4/2008 |
| GB | 615753 A | 1/1949 |
| JP | H6-219814 A | 8/1994 |
| JP | 2006-27795 A | 8/2007 |
| WO | 2003051488 A1 | 6/2003 |
| WO | 2004011124 A1 | 2/2004 |
| WO | 2004011386 A1 | 2/2004 |

OTHER PUBLICATIONS

Harter, L., et al., "Area Suction Gripper", Schmalz J. GmbH, EP1916206A1, Machine Translation.
Schmalz, K., et al., "Pneumatic gripper comprises base connected to vacuum source and flexible gripper plate fitted on to front of base which has apertures with foam plastic", Schmalz J. GmbH, DE10245716A1, Machine Translation.
Koller, H., "Suction gripper mechanism—has seal sealing it to surface of object to be gripped formed of soft elastic, pres. opencelled foam material", Manitec AG, CH682072A5, Machine Translation.
Schmalz, K., et al., "Surface Gripper", Schmalz J. GmbH, DE102004016637A1, Machine Translation.
Paugh, B., et al., Pawling Engineered Products, Pawling, N.Y., Machine Design, Fastening/Joining, Getting a (Gentle) Grip, pp. 1-3.
Diesel Particulate Filters, "Aerify Diesel Particulate Filters", Dow Automotive Systems, The Dow Chemical Company, 1250 Harmon Road, Auburn Hills, Michigan 48362 USA, Product Brochure, Form No. 299-51493-612 HMC.
Diesel Particulate Filters, Aerify Diesel Particulate Filters, Dow Automotive Systems, The Dow Chemical Company, 1250 Harmon Road, Auburn Hills, Michigan 48362, Form No. 299-51801-0910 BB1, Product Brochure.
Chinse First Office Action, CN Application No. 201380052145 dated Mar. 18, 2016.
Chinse Second Office Action, CN Application No. 201380052145 dated Nov. 16, 2016.
Japanese Office Action, CN Application No. 2015-537682 dated Mar. 8, 2017.

* cited by examiner

DEVICE, SYSTEM, AND METHOD FOR LIFTING AND MOVING FORMABLE AND/OR COLLAPSIBLE PARTS

CLAIM OF PRIORITY

The present application claims the benefit of U.S. Provisional Patent Application 61/716,158 filed on Oct. 19, 2012, which is incorporated herein by reference in its entirety for all purposes.

FIELD OF THE INVENTION

The present invention relates to devices, apparatuses, systems, and methods of handling parts using a vacuum. In particular the invention relates to lifting and moving parts that are in a formable state and/or have cells that are easily collapsed.

BACKGROUND OF THE INVENTION

Many methods for handling formed parts that are in a solid state are known in the art. For example, the use of a vacuum for lifting parts is known where a sealed space is formed over one or more generally small areas on a surface of the part being lifted. A strong vacuum is applied to the sealed space so that the entire part can be lifted. Other similar devices employ suction cups to small regions of the surface of the part being lifted. When using these devices on parts having a tight dimensional tolerance, it is typically important that the part being lifted be in a solid state and Is not in a formable state.

When handling a part that is in a formable state, the movement of the part may result in changes or distortions to the part from the forces exerted in lifting the part. In some parts, such as parts that have a generally solid profile (e.g., without cells), the thickness of the part may minimize any changes to the overall dimensions of the part, in other situations, the part is moved using a conveyor or other mechanism that supports the part by its bottom and does not lift the part.

When handling delicate extruded parts, such as parts having a plurality of cells, thin walls, or both, there is difficulty in lifting the parts while the material is in a formable state. When such parts are lifted using conventional methods, there may be a need for one or more finishing steps to remove imperfections developed during the movement of the part and/or there may be need for design accommodations to compensate for possible deformation of the part. The difficulty in handling a part may be related to the state of the material in the part, one or more structural features of the part, or both. For example, parts that have not been sintered (i.e., pre-sintered parts) and/or parts that have not had hinder removed (i.e., pre-debindered parts) may be in a formable state that creates difficulty in lifting the part. An example of a part having structural features that may result in difficulty in handling the part is an extruded part having a cross-section with multiple rows and/or multiple columns of open cells that generally extend the length of the extruded part, such as a part having generally honeycomb cross-section.

There is an ongoing need for devices, apparatuses, systems and methods for handling delicate parts that are in a formable state. For example, there is a need for improved vacuum pickup assemblies for lifting such parts with reduced or even no visible deformation of the part.

Additionally, there is a need for vacuum pick up devices having one or more of the following features: ability to pick up parts that are collapsible; reduces or eliminates the deformation of part; reduces or eliminates any witness marks; or ability to handle ceramic parts that are in a wet and/or green state.

The devices, apparatuses, systems and methods according to the teachings herein may advantageously be used for handling delicate parts that are in a formable state. For example, when employed in lifting a part that is in a formable state, the improved vacuum pickup assemblies advantageously reduce or even eliminates any visible deformation of the part. The vacuum pick up devices according to the teachings herein may have one or any combination of the following features: capability of reducing or eliminating the deformation of parts that are collapsible, capability of reducing or eliminating witness marks on parts, or capability of handling ceramic parts that are in a wet and/or a green state. For example, the vacuum pick-up devices may be employed with parts that are pre-sintered, pre-debindered, or both.

SUMMARY OF THE INVENTION

A first aspect of the invention is directed at an device for picking up a part comprising: a vacuum pickup device including a vacuum line for connecting with a vacuum; a plenum in fluid communication with the vacuum via a vacuum line, wherein the plenum has a relatively small opening for connecting with a vacuum line and a relatively large opening for spreading the vacuum over a surface of the part; a distributor plate sufficiently large for covering the relatively large opening of the plenum, wherein the distributor plate has opposing first and second surfaces wherein the first surface faces the plenum and the second surface faces away from the plenum, wherein the second surface is generally planar; and an open celled foam having opposing first and second surfaces, wherein the open cell foam is sufficiently large so that its first surface substantially or entirely covers the second surface of the distributor plate; wherein the open cell foam is sufficiently porous so that the second surface of the open cell foam and the vacuum are in fluid communication. The device may be particularly useful in moving parts that are in a formable state.

Another aspect of the invention is directed at a process for moving a part using a device according to the teachings herein, the process comprising: a step of contacting the top surface of the part with the foam of a vacuum pick-up device; applying a sufficient vacuum to the plenum so that the gravitational force from the mass of the part is overcome by force of the vacuum; and lifting the part by moving the vacuum pick-up device in the vertical direction. The part preferably is in a formable state. The part preferably is an extrudate, such as an extrudate having a structure that includes one or more cells extending the length of the part. The part is preferably moved while the part is in a formable state.

BRIEF DESCRIPTION OF DRAWINGS

FIG. 11 is a perspective view of a formable part having a generally uniform profile. As illustrated in FIG. 11, the profile may have a generally honeycomb structure.

DETAILED DESCRIPTION

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. One or more as used herein means that at least one, or more than one, of the recited components may be used as disclosed.

Definitions

As used herein, a formable state (e.g., an easily formable state) is a liquid state, melt state, moldable clay state, or other dough-like state capable of flowing under an applied shear force, capable of being extruded, or both. If the material is in a liquid state, the zero shear viscosity (i.e., the viscosity obtained by extrapolation of the shear rate versus viscosity curve to a shear rate of zero) preferably is sufficiently high so that a formed part is capable of generally maintaining its shape between the time of forming and the time the material is no longer in a formable state. While in a formable state, the material preferably is extrudable (i.e., capable of being formed into a shape using an extrusion process).

As used herein, a formable part is a part that includes or consists essentially of a material that is in a formable state. The mass of material in a formable state in the formable part is preferably about 50 weight percent or more, more preferably about 80 weight percent or more, even more preferably about 95 weight percent or more, and most preferably about 99.5 weight percent or more, based on the total weight of the formable part. For example, the formable part may consist entirely of material that is in a formable state.

The various aspects of the invention related to devices, systems and processes for moving parts that are in a formable state using a vacuum to overcome the gravitational forces acting on the part being moved. A vacuum pick-up device is employed for moving the part, such as by lifting and/or by moving the part in one or more horizontal directions. The vacuum pick-up device according to the teachings herein may have one or more of the following benefits: reduction and/or elimination in the deformation of the part reduction and/or elimination of witness marks on the part, or ability to maintain tighter tolerances in the part geometry.

The various aspects of the invention may be characterized by one or any combination of the following features: the distributor plate is sufficiently rigid and the vacuum is sufficiently strong so that the apparatus can lift up a formable part having a low modulus part that is formable and having a generally flat top surface and an inferior with a plurality of elongated cells, substantially without changing the shape of the part; the second surface of the foam covers the entire fop surface of the part; the distributor plate has about 20 or more perforations, and the ratio of the total area of the perforations to the total area of the first surface of the plate is about 0.8 or less; the apparatus includes a conveyor for moving the part to be lifted from a previous stage of the process, for example, in a generally horizontal direction, and a movement device for initially moving the vacuum pick-up device synchronously with the conveyor while contacting the foam with the part; the movement device is capable of moving vertical to lift the part; moving faster than the conveyor in the horizontal direction while lifting the part; or both; the apparatus includes an extruder for extruding a mixture including, consisting essentially of, or consisting entirely of one or more inorganic materials; about 35% or more of the atoms in the part are oxygen atoms; the apparatus includes a die for forming the part having a generally continuous profile including an array of elongated cells; the apparatus includes a conveyor for conveying the extrudate away from the die, for example in the horizontal direction; the apparatus is capable of lifting the part without leaving a witness mark, without distorting the shape of the part, or both; the apparatus includes a valve or switch for controlling or otherwise regulating the level of vacuum in the plenum; the movement device is capable of moving the part from the conveyor to a predetermined location wherein each dimension of the part changes by about 4% or less while the part is moved; the extrudate includes, silicon atoms, aluminum atoms, or both; the process includes a step of extruding a mixture including one or more inorganic compounds through an extruder; the process includes a step of forming a profile by passing the mixture through a die; the process includes a step of conveying the extrudate away from the die using a conveyor in the extrusion direction; the process includes a step of cutting the extrudate info a predetermined length using an ultrasonic knife, a wire cutter, or both; the extrudate includes clay; or the extrudate has three or more rows of open cells including an uppermost row of open cells and a top outer wall above the uppermost row of open cells, wherein the step-of pre-cutting the extrudate includes cutting entirely through the top outer wall so that the uppermost row of open cells is exposed; all of the cells of the part remain open after moving the part; or the extrudate part has a generally rectangular top surface with a width and length and the second surface of the open cell foam has a width that is greater than the width of the part, and a length that is greater than the length of the part.

The apparatus for picking up the formable part (i.e., the part including, consisting essentially of, or consisting entirely of formable material) includes a vacuum pick-up device for contacting with the part to be picked up. The vacuum pick-up device is a device capable of distributing a vacuum over a surface of the part. The vacuum pick-up device generally is capable of distributing a sufficient vacuum over the surface of the part so that gravitational forces are overcome and the part can be lifted. The vacuum pick-up device preferably employees a vacuum that is sufficiently low so that any deformation of the part from the vacuum is reduced or eliminated.

Preferably, the vacuum pick-up device is capable of lifting the part without leaving a witness mark, without distorting the shape of the part, or both.

The vacuum pick-up device includes a porous layer for contacting a part to be picked up and a vacuum chamber that is in fluid communication with the porous layer. The vacuum chamber may be formed by a distributor plate capable of distributing the vacuum to the porous layer and a plenum. The plenum may be capable of forming a cavity for the vacuum chamber. The distributor plate may be generally interposed between the porous layer and the plenum. The porous layer preferably has a first surface for contacting a surface (i.e., the contacting surface) of the part to be moved and an opposing surface. The opposing surface of the porous layer may be used for contacting the distributor plate. The porous layer generally has a sufficient number of pores and are sufficiently open so that the opposing surfaces of the porous layer are in fluid communication. The distributor plate preferably is connected to the plenum for creating a vacuum chamber. For example, the distributor plate and the plenum may be sealingly connected. Preferably, the plenum and distributor plate are sealingly joined or otherwise attached so that air does not flow into the vacuum chamber through the spaces between the plenum and the distributor plate. Optionally, the vacuum pick-up device includes a sealing component such as a seal, gasket, adhesive, or other feature suitable for providing a leak-proof seal between the plenum and the distributor plate. The distributor plate preferably has a sufficient number of openings so that the vacuum from the vacuum chamber is distributed over the contacting surface of the part, is distributed throughout the open pores of the porous layer, or both. The plenum may include one or more vacuum receiving openings suitable for connecting the vacuum chamber to a vacuum source.

The vacuum pick-up device may be used in an apparatus for picking up a part that is in a formable state. The apparatus may include a vacuum pick device according to the teachings herein, one or more vacuum sources and one or more vacuum lines. The vacuum line preferably includes one or more passages for providing a fluid communication between the vacuum source and the vacuum chamber. The apparatus may include a fluid control component suitable for controlling the level of vacuum in the vacuum chamber. For example, the fluid control component may be a valve that controls the fluid connection between the vacuum source and the vacuum chamber. If employed, the fluid control component may be located anywhere between the vacuum source and the vacuum chamber of the plenum.

The apparatus may include one or more movement devices suitable for moving the vacuum pick-up device. The movement device may be capable of moving the vacuum pick-up device in any direction. For example, the movement device may be capable of movement in a vertical direction and/or in one or more horizontal directions.

The apparatus may be employed in picking up a formable part having a surface suitable for contacting with the vacuum pick-up device. The formable part preferably is picked up solely by the vacuum forces exerted on the surface of the part that contacts the porous layer of the vacuum pick-up device. As such, the vacuum forces may be greater than the gravitational force due to the mass of the part.

The porous layer may have a deformed region that is deformed by the vacuum force acting on the part when the part is lifted. This deformed region typically deformed when the pick-up device contacts the part and returns to an undeformed state when the part is released and the pick-up device is withdrawn from the part. It will be appreciated that the deformed region may be defined by the shape of the part, the positioning of the part relative to the porous layer, or both. When the part is picked up, the thickness of the porous layer may be reduced in the deformed region compared with the thickness of the porous layer when it is not in contact with a formable part. The porous layer facing the part may have one or more non-deformed regions that does not contact the part. The non-deformed regions may include one or more periphery regions. The periphery region preferably is not compressed by the formable part. As such, when moving the part, the porous layer, may be characterized as having a non-deformed region (e.g., a periphery region) that is thicker than the porous layer in a deformed region. While moving the formable part, the porous layer preferably is sufficiently porous so that air can flow from outside the device, through at least a portion of the porous layer and through at least one of the openings in the distributor plate. As such, the porous layer may allow for limited leakage of air into the vacuum chamber. Such leakage of air into the vacuum chamber may reduce the level of vacuum in the vacuum chambers that any deformation of the deformable part is reduced or eliminated.

When lifting the part, preferably one or more, or even all of the regions of the part that is in fluid contact with the vacuum from the vacuum chamber is not sealed. This differs from traditional uses of vacuum to pick-up objects where a vacuum seal is created so that a relatively high vacuum can be established. Such high vacuum could damage the deformable parts according to the teachings herein.

When the part is picked up, the vacuum is preferably distributed across (e.g., throughout) the surface of the part that faces the porous layer. For example, the porous layer may contact substantially the entire upward facing surface of the part. By exposing a large portion of the surface area of the part that faces the porous layer to the vacuum, it is generally possible to use a lower level of vacuum to lift the part and thus the deformation of the part may be reduced or eliminated.

According to the teachings herein, the vacuum is preferably distributed amongst a plurality of openings in a distributor. Each opening has an area, and the sum of all of the opening areas is the total opening area. Preferably the ratio of the area of the opening having the largest area to the total opening area is about 15% or less, more preferably about 10% or less, even more preferably about 5% or less, and most preferably about 2% or less.

Preferably the pick-up device avoids placing a compressive force on the formable part. Preferably, the pick-up device avoids placing a tensile force on the part other than the force counteracting the gravitational force. Preferably, the pick-up device avoids placing a shear force on the formable part. As such, there may be little or even no change in the shape of the part caused by the compressive forces from the pick-up device. For example, the part may have generally the same shape prior to being picked up and after being moved by the apparatus. As used herein, a part having generally the same shape may have a width, and or height that is changed by less than +/−5%, preferably less than +/−2%, more preferably less than +/−1%, and most preferably +/−0.5%.

The plenum is a component that is capable of receiving connecting to a vacuum through a relatively small opening and providing that vacuum to a relatively large area. The plenum may be formed as a single component or may include a plurality of subcomponents that are assembled into the plenum. The plenum includes one or more vacuum receiving openings suitable for connecting with a vacuum line. Preferably, the plenum includes a single vacuum receiving opening. The plenum has a vacuum dispensing opening for dispensing the vacuum over a large area. The ratio of the area of the vacuum dispensing opening to the vacuum receiving opening preferably is sufficiently large so that loss of vacuum and material needed for a vacuum line is reduced. For example the ratio of the area of the vacuum dispensing opening to the area of the vacuum receiving opening may be about 1.5 or more, about 4 or more, about 20 or more or about 100 or more, or about 300 or more. The vacuum dispensing openings may be employed to provide the vacuum to a large surface area of a part. Typically, the ratio of the area of the vacuum dispensing opening to the area of the vacuum receiving opening of the plenum is about 10,000 or less, about 5,000 or less, or about 1,000 or less. However, area ratios greater than 10,000 may also be employed.

The plenum may have one or more attachment features for attaching the plenum to the distributor plate so that a vacuum chamber is created by the two components. For example, the plenum may have one or more openings or holes for receiving a bolt, screw or other fastening component. A plenum may also be attached to a distributor plate using an a gasket, a sealing material, or other material suitable for sealingly attaching the two components. The plenum may have one or more attachment features for attaching the plenum to a movement device so that the vacuum pick-up device can be moved. The plenum should be sufficiently rigid so that it can maintain the vacuum in the vacuum chamber without the walls of the plenum collapsing.

The vacuum pick-up device includes a distributor plate that provides the dual functions of distributing ever a large region and providing a rigid support surface. It will be appreciated according to the teachings herein that the surface of the distributor plate that faces a part to be picked up may preferably is conformed to the shape of the surface of the part to which the vacuum pick-up device contacts.

The distributor plate openings should have a generally small dimension. For example the openings may be cylindrical openings (i.e., having a circular profile) having a diameter that is generally small. As another example, the openings may have a generally cubic shape with at least one dimension (e.g., at the part facing surface of the distributor plate) that is generally small. If the small dimension has a distance x, then the distance between the center of the opening and a solid part of the distributor plate will be about x/2. By keeping x/2 small, it is possible to ensure that the surface of the part will be directly supported by the distributor plate or will rest close to the distributor plate. The openings preferably have a dimension, x, that is about 15 mm or less, more preferably about 10 mm or less, even more preferably about 5 mm or less, even more preferably about 2 mm or less, and most preferably about 1 mm or less. The openings preferably have a dimension (e.g., a diameter), x, sufficiently large so that the openings do not get plugged during use. For example the openings preferably have a dimension (e.g., a diameter), x, that is about 0.005 mm or more, more preferably about 0.05 mm or more, and most preferably about 0.1 mm or more.

The distributor plate may have a first surface that faces a part, and an opposing second surface that faces away from the part. The second surface may face towards the plenum, face towards the vacuum chamber formed by the distributor plate and the plenum, or both. The openings in the distributor plate generally extend from the first surface to the opposing second surface. The size of any opening at the first surface may be smaller than, the same size as, or greater than the opening at the second surface. The distributor plate preferably has one or more opening regions including openings distributed throughout the region. For example all of the openings may be in a single opening region that is generally contiguous. The distributor plate may optionally include one or mom generally solid regions that are generally free of openings for providing a fluid communication with the vacuum chamber. Preferably, one or more of (e.g., all of) the generally solid regions, are positioned along the external periphery of the surface.

The spacing between adjacent openings preferably is small so that a large surface of the part is exposed to the vacuum. For example, the ratio of the distance between adjacent openings (e.g., as measured from the center of the two openings) to the opening dimensionx(e.g., as measured by the diameter of an opening), R, preferably is about 30 or less, more preferably about 10 or less, even more preferably about 4 or less, even more preferably about 2 of less, and most preferably about 1.6 or less. The spacing between adjacent openings should be sufficiently large so that the distributor plate is durable, so that the distributor plate does not cut into the surface of the part, or both. For example the ratio R, may be about 1.1 or more about 1.2 or more, about 1.3 or more, or about 1.4 or more.

The portion of the distributor plate that is above a part being moved will have a first area fraction that is a rigid material for supporting the plate and a second area fraction that is openings for providing the vacuum to the surface of the part. The first area fraction should be sufficiently high so that the part is supported by the distributor plate and the porous layer between the distributor plate and the part. For example, the area fraction of the first area may be about 10% or more, about 20% or more, about 30% or more, about 40% or more, about 50% or more, or about 60% or more. The second area fraction should be sufficiently high so that the vacuum can generally be dispersed through the porous layer. For example, the second area fraction may be about 3% or more, about 8% or more, about 16% or more, about 23% or more, or about 31% or more. The number of openings in the distributor plate for providing a vacuum to the surface of the part should be sufficiently large so that the part can be picked up. For example, the number of such openings may be about 5 or more, about 10 or more, about 20 or more, about 100 or more, or about 500 or more. The concentration of openings (in units of openings per square centimeter) may be about 0.01 or more, about 0.1 or more, about 1.0 or more or about 3.0 or more. Preferably any region that contains 10 or more openings has a large fraction of that region that is open. For example the ratio of the total area of the openings to the total area of the region bounded by the outermost openings preferably is about 0.03 or more, more preferably about 0.08 or more, even more preferably about 0.16 or more, even more preferably about 0.23 or more, and most preferably about 0.31 or more. The ratio of the total area of the openings to the total area of the region bounded by the outermost openings preferably is about 0.8 or less, more preferably about 0.65 or less, and most preferably about 0.5 or less. Some or all of the openings in the distributor plate for providing the vacuum to the part are preferably characterized as being evenly spaced, distributed over an entire region, or both. The distributor plate may include a plurality of openings for providing a fluid connection between a vacuum chamber and a porous layer, one or mare connection features, and a solid region that is generally free of the openings. The distributor plate may include one or more sealing features for reducing or eliminating leakage between the distributor plate and the plenum. For example, the distributor plate may include one or more channels channel (e.g., a groove). The channel may be suitable for receiving a portion of a wall of a plenum, for receiving a sealing material, or both. The channel, if employed, preferably is on the second surface of the distributor plate (i.e., the surface that faces towards the plenum). The distributor plate may include one or more connection features. A connection feature may be employed for connecting the distributor plate to another component, such as to a plenum. The connection feature may be sized or otherwise configured for receiving a screw, a belt, or other fastener. The connection feature may include a hole that extends partly or entirely through the plate. The connection may include a hole that is threaded or unthreaded. Any connection feature preferably is positioned and designed so that when used with a fastener for connecting the distributor plate, the connection feature and the fastener do not contact the formable part being moved. In addition to or as an alternative to the aforementioned connection features, the distributor plate and the plenum may be attached using a snap fit, and adhesive, a sealant, a gasket, or any combination thereof. The distributor plate should be sufficiently rigid so that the surfaces of the distributor plate maintain a generally constant shape during use. For example, the surface may maintain a generally constant shape within a single cycling of lifting and dismounting a part, over many cycles of such use, or both. Preferably, the distributor plate is sufficiently rigid so that any bending under the forces that it encounters (including contacting with a part and forces from the vacuum) are reduced or eliminated.

The second surface of the distributor plate may have any shape. The second surface of the distributor plate may be generally planar, or may be non-planar. Preferably the surface is contoured to match the contour of the top surface of the part being lifted. By way of example, the part being lifted may have a generally semicircular cross-section with the arcuate surface facing upward, and the distributor plate may have a shape that allows the part to nest with the distributor plate. It will be appreciated that the distance between the part and the distributor plate may be generally uniform. Preferably, the standard deviation of the distance between the part and the distributor plate is about 10 mm or less, more preferably about 5 mm or less, even more preferably about 3 mm or less, even more preferably about 2 mm or less, and most preferably about 1 mm or less, in a particularly preferred vacuum pick-up device, both the distributor plate and the surface of the part nave generally planar surfaces.

The plenum and the distributor plate may be attached or otherwise combined to form a chamber. For example, the distributor plate and the plenum may be sealing attached around a periphery of one or both components. The distributor plate may cover the relatively large opening of the plenum for forming a chamber. The chamber may be a vacuum chamber which is at least partially evacuated using a vacuum source. The attachment between the plenum and distributor may be by any means. For example, they may be attached using an adhesive, a brazing, one or more mechanical fastener, or any combination thereof. The plenum and distributor plate preferably are sealingly attached so that vacuum does not leak out of the vacuum chamber through a space between the plenum and the distributor.

The apparatus may employ a porous material to further distribute the vacuum along the surface. The porous material has a surface that contacts the part. The porous material preferably has a generally low modulus so that it can deform to accommodate the surface of the part. Preferably the modulus of the porous material is lower than the modulus of the malleable part. The porous material may be a foamed material, an elastic material, or both. As used herein, an elastic material is a material having a tension set of about 20% or less after being stretched to an elongation of 100% for 10 minutes with the set being measured after allowing the material to relax for 10 minutes, all tested at room temperature. Preferably, the porous material is a foamed material including open cells. The foam preferably includes a sufficient number of open cells (i.e., is sufficiently porous) so that the opposing surfaces of the foam are in fluid communication through the foam. The porous layer preferably is sufficiently thick so that it can cushion the part. For example, the porous layer may be sufficiently thick so that it can accommodate any differences between the contour of the part and the contour of the surface of the distributor plate that faces the part. The porous layer preferably is sufficiently porous so that there is not significant constriction of the pores when the part is pressed against the porous material by the vacuum. For example, the percentage of the pores that become constricted may be about 80% or less, about 40% or less, about 25% or less, about 10% or less, about 5% or less, or about 2% or less. The percentage of the pores that become constricted may be about 0% or more, about 0.5% or more, or about 1% or more. The porous layer preferably has a generally large surface area for contacting the part so that a large portion of a surface of the part contacts the porous layer. The porous layer may have a surface area, $A_1$, facing a part and the part may have a top having a surface area $A_2$. Preferably the ratio of $A_1/A_2$ is generally large. For example, the ratio of $A_1/A_2$ may be about 0.5 or more, about 0.7 or more, about 0.8 or more, about 0.9 or more, or about 1.0 or more. It will be appreciated that the ratio $A_1/A_2$ may be greater than 1.0, such as about 1.01 or more, or about 1.05 or more. The ratio $A_1/A_2$ preferably is sufficiently low so that the amount of vacuum that is leaked is not overly burdensome on the vacuum source. Preferably $A_1/A_2$ is about 2.0 or less so, more preferably about 1.4 or less, even more preferably about 1.1 or less, and most preferably about 1.05. It will be appreciated that a ratio of $A_1/A_2$ less than 1.0 may be employed so that there is substantially no overlap of the porous layer and thus minimal leakage of the vacuum. Nevertheless, some leakage of the vacuum is typically preferred so that an air tight seal between the part and the pick-up device is avoided. This is distinguishing from prior art devices that form a tight seal, such as a suction seal for lifting a part. Such a seal could permanently deform a part that is in a formable state, and may result in parts that are out of tolerance. Preferably the porous layer contacts the top surface of the part. As such, the porous layer may be the bottom layer of a vacuum pick-up device. The system may include a vacuum source. The vacuum source preferably provides a sufficient vacuum to the vacuum pick-up device for picking up the part with only the vacuum force between the device and the part to overcome the gravitational force on the part. Any known vacuum source may be employed. By way of examples, the vacuum sources may include a vacuum pump, a venturi pump, or both. The level of vacuum in the vacuum chamber of the vacuum pick-up device should be sufficiently high so that the part can be lifted. For example, the vacuum in the vacuum chamber while lifting the part, while moving the part, or both, may be about 0.1 mm Hg or more, about 0.5 mm Hg or more, about 1 mm Hg or more, or about 2 mm Hg or more. The level of vacuum in the vacuum chamber of the vacuum pick-up device should be sufficiently low so that witness marks or other deformation of the surface of the part is avoided. For example, the level of vacuum in the vacuum chamber while lifting the part, while moving the part, or both, may be about 300 mm Hg or less, about 200 mm Hg or less, about 100 mm Hg or less, about 50 mm Hg or less, about 30 mm Hg or less, about 20 mm Hg or less, about 10 mm Hg or less, or about 5 mm Hg or less.

The vacuum in the vacuum chamber white lifting the part, while moving the part, or both, preferably is only slightly greater than the amount necessary to overcome the gravitational forces of the part. The part may have a mass, m, and the gravitational force on the part may be mg. During lifting of the part, the vacuum forces on the part may be $F_v$. Preferably the ratio of the vacuum force to the gravitational force (i.e., $F_v/mg$) is generally low, but greater than unity. For example, the ratio $F_v/mg$ is about 100 or less, more preferably about 50 or less, even more preferably about 10 or less, even more preferably about 5 or less, even more preferably about 3 or less, even more preferably about 2 or less, and most preferably about 1.7 or less. The ratio $F_v/mg$ preferably is about 1.01 or more, more preferably about 1.05 or more, and most preferably about 1.1 or more. The system may include one or more vacuum lines for providing the vacuum to the vacuum pick-up device. The vacuum line may provide a fluid communication between the vacuum chamber of the vacuum pick-up device and the vacuum source. Some or all of the vacuum line may be flexible so that a fluid connection is maintained even when the vacuum pick-up device is being moved. The system may include one or more valves or controllers for controlling the vacuum in the vacuum chamber of the vacuum pick-up device. The controller may include one or more sensors for measuring a pressure, such as a pressure in the vacuum chamber. The controller may control one or more valves or switches so that the vacuum is increased, maintained, or decreased. The controller may increase the vacuum (i.e., decrease the pressure) in the vacuum chamber for contacting and engaging the part so that it can be lifted. The controller may decrease the vacuum for disengaging or releasing the part. The system may include a vacuum release mechanism for reducing the vacuum in the vacuum chamber for disengaging the part from the vacuum pick-up device. The system may include one or more valves. For example a valve may be employed to control the vacuum between the vacuum source and the vacuum pick-up device. A valve may be employed for controlling the vacuum release mechanism.

The system may include a movement device suitable for moving the vacuum pick-up device. The movement device may move the pick-up device to a position for contacting a surface of a part. The movement device may be capable of maintaining the pick-up device in a fixed location relative to a moving part. For example, the movement device may be capable of moving the pick-up device synchronously with an extruded part being conveyed away from an extruder. The movement device may be capable of lifting the pick-up device in a generally upward vertical movement for placing the lifting a part. The movement device may be capable of moving the pick-up device to a station for placing the part. The movement device may be capable of a downward vertical movement for lowering the part onto a substrate in the station. It will be appreciated that the station may be employed for storing a plurality of parts. As such, the movement device may be capable of remembering or otherwise identifying the locations of other parts and/or available positions for placing a part. It should be noted that other directions of movement may be needed. For example, the movement device may move the part in a perpendicular direction, the movement device may move the part to a conveyor, the movement device may move the part to an apparatus for performing a secondary operation, or any combination thereof. A step of de-bindering (e.g., an initial step of debindering) the part may be performed after moving the part with the movement device. A step of sintering (e.g., and initial step of sintering) may be performed after moving the part with the movement device. The movement device may be any known device suitable for moving the pick-up device in the directions necessary to relocate (i.e., reposition) the part. The movement device may be capable of identifying the location of the part to be relocated. The movement device may be capable of from 2 to 6 axis of movements. As the extrudate is generally moving axially away from the extruder die, it is preferred that the device is capable of 3 or more axis of movement. Devices capable of greater than 2 axis of movement may allow for contacting a moving part, lifting of the part, and repositioning of the part. Exemplary devices include robots, pneumatically-actuated 2-d slides, linear motion systems, rotary motion systems, and the like. The device may be pneumatic, hydraulic and electromechanical driven motion systems.

When contacting the vacuum pick-up device with a part that is moving on a conveyor, it is preferred that the movement device is causing the vacuum pick-up device to move synchronously with the part. After the part is contacted and during the initial lifting of the part away from the conveyor, the movement device preferably moves the part in the direction of the conveyor at the same rate or at a faster rate than the conveyor.

The apparatus or system may include one or more positioning controllers for controlling the position of the vacuum pick-up device. For example, the controller may control the position of the vacuum pick-up device relative to a moving workpiece (e.g., a formable part). The positioning controller may include one or more activators or sensors for determining whether the pick-up device is properly located with respect to the workplace. The positioning controller may include one or more activators or sensors for determining when a step of contacting the pick-up device with the workplace should be performed. The positioning controller may include one or more activators or sensors for determining that the workpiece can be lifted. For example, the controller may monitor the vacuum level to ensure that there is sufficient vacuum for lifting the workpiece. The positioning controller may control one or any combination of the following: the start of a step of lifting a workpiece, the motion of the vacuum pick-up device while the part is being moved, the motion of the moveable pick-up device when the part is being released from the vacuum pick-up device, or the motion of the vacuum pick-up device after releasing the workplace.

The devices, apparatus, systems, and methods according to the teachings herein may be employed in moving a part (e.g. an extruded part) having a cross-section that is solid or a cross-section having one or more cells. As discussed hereinbefore, the part preferably is in a formable state. Preferred parts are extruded parts or otherwise formed parts have a cross-section in the transverse direction with one or more openings. For example, the part may have a generally uniform profile, may have one or more open cells extending the length of the part, or both. The part will generally be supported by a substrate, such as a stationary substrate or a moving substrate prior to being moved. For example, the part may be supported by a moving substrate such as a conveyor belt. The part may have a cell (e.g., an open cell) with one or more walls that surround some of, or all of the cell. For example, the part may have one or more side walls (e.g., generally vertical side walls), a top wall (e.g., a generally horizontal top wall), a bottom wall (e.g., a generally horizontal top wall, or any combination thereof. The cell may be surrounded by any number of walls. An open cell is open on one or more sides. For example, the open cell may be open on the front side of the cell, on the back side of the cell, or preferably both. The part may have a cell surrounded by a single wall. For example the part may have a generally cylindrical open cell surrounded by a single wall. The part may have a cell surrounded by a plurality of walls. For example, the part may have two or more, three or more, four or more, or six or more walls. Walls that are curved (such as a single wall in a cylindrical opening) may be characterized as having regions that are generally horizontal (e.g., having a slope of less than 25°) and regions that are generally vertical (e.g., having a slope of at least 25°). As used herein, a vertical wall may be a vertical region of a curved wall, a horizontal wall may be a horizontal region of a curved wall, or both. A wall may be characterized as having a thickness which is uniform or which may vary.

When moving the part with the pick-up device, the direction of initial movement may be in any direction. For example, the direction of movement may be include an lifting of the part in the vertical direction. The direction of initial movement of the part by a pick-up device may be in the thickness direction of one of the walls, such as a top wall. The part may be moved by contacting a vacuum pick-up device to an outer surface of one or more walls. Preferably, the vacuum pick-up device contacts the top wall of the part. The top wall may be supported by one or more walls support walls. The width of the top wall may be generally large, the thickness of a support wall may be generally low, or both, so that particular care must be taken to prevent collapse or other deformation of the opening when contacting the part with the pick-up device, when applying a vacuum to the surface of the top wall, and when moving the part. The part may have a top surface that is planar, arcuate, or both. Preferred parts have a generally planar top surface. The part may have a bottom surface that is planar, arcuate, or both. Preferred parts have a generally planar bottom surface.

Particular benefits of are obtained when the part has a cross-section that includes a plurality of cells that extend the length of the part (e.g., the length of the extrudate). Lifting and moving of formable parts having a large number of cells may be accomplished using the devices, apparatuses, systems, and methods according to the teachings herein. For example the extrudate may have about 2 or more, about 6 or more, about 12 or more, about 20 or more, about 30 or more, or about 80 or more cells. The cells may be arranged in a regular pattern or may be irregularly arranged. For example, the cells may be arranged in an array including one or more rows, and one or more columns. The number of rows preferably is 2 or more, 4 or more, or 7 or more. The number of columns preferably is 2 or more, 4 or more, or 7 or more. The repeating pattern may include any number of cells. For example, the cross-section may have a repeating pattern with a single cell, or a repeating pattern with two or more cells. The part (e.g., the extrudate) preferably is characterized as having a plurality of cells including a first row of cells near the bottom of the part and a top row of cells near the top of the part. For example, the part may have two or more (e.g., three or more) rows of open cells including an uppermost row of open cells and a top outer wall above the uppermost row of open cells. The structure of the part (e.g., the extrudate structure) may be a generally honeycomb structure. For example, the structure may be characterized as having generally hexagonally shaped open cells. The part may have an array of generally rectangular or square shaped cells. It will be appreciated that the spacing between cells may be generally uniform. However, irregularly spaced cells may also be employed.

The part may be formed from an extrudate. The extrudate may have one or more outer surfaces that are arcuate, one or more surfaces that are planar, or both. If the extrudate has a bottom surface that is arcuate, a carrier may be employed for conveying or otherwise carrying the part. The extrudate structure preferably has a generally planar bottom so that the extrudate can be conveyed along a generally flat (e.g., planar) conveyor belt. The outer cross-sectional shape of the part (i.e., the outer perimeter of the cross-section of the part) perpendicular to the machine direction may have two or more sides, three or more sides, or four or more sides. For example the outer cross-sectional shape of the part may be a triangle, a square, a rectangle, a pentagon, a hexagon, a semi-circle, or a semi-oval, a semi-ellipse. Preferably, the part has a generally uniform cross-section with an outer perimeter that is generally polygonal, and more preferably generally rectangular. Preferably the part has a plurality of open cells that are uniformly distributed throughout the cross-section of the part.

The apparatus, devices and systems may be employed to pick up generally heavy parts using a vacuum. The parts may be characterized by the area density of the part as defined by dividing the mass of the part by the area of the top surface of the part. Particular utility is found when the part has an area density is about 5 kg/m$^2$ or more, about 10 kg/m$^2$ or more, about 20 kg/m$^2$ or more, or about 40 kg/m$^2$ or more. Typically, the part has an area density of about 600 kg/m$^2$ or less, or about 120 kg/m$^2$ or less. It will be appreciated the parts having an area density of about 5 kg/m$^2$ or less may also be employed.

The system may include an extruder, an extruder die, an extrudate conveyor, a secondary conveyor downstream of an extrudate conveyor, a drying or baking device, a sensor for measuring one or more dimensions of the extrudate or part, or any combination thereof. The system may include an extruder for extruding the extrudate. For example, the extruder may be suitable for extruding a mixture including, consisting essentially of, or consisting entirely of one or more inorganic materials. The system may include a die for forming a profile for the extrudate. The system may include an extrudate conveyor for conveying the extrudate away from the die in the horizontal direction. The system preferably includes a die for forming a part having a generally continuous profile including one or more elongated cells. For example the die may produce a profile characterized by one or any combination of the following: the profile includes one or more rows of cells, the profile includes one or more columns of cells, the profile includes an array of elongated cells, the profile includes a honeycomb arrangement of cells, or the profile includes four or more cells. Preferably the die is capable of producing a profile having an array of elongated cells. For example the die may be capable of producing a profile having 3 or more rows of cells (e.g., five or more rows of cells). The die may be selected so that the cross-section of the extrudate profile (i.e., perpendicular to the extrusion direction) has a profile cross-sectional area and the cross-section of the extrudate profile has cells having a total cell cross-sectional area, wherein the ratio of the total cell cross-sectional area to the profile cross-sectional area is about 0.4 or more.

The extruder may extrude a material at a temperature near ambient temperature (i.e., from about −5° C. to about 38° C.) or at an elevated temperature (i.e., above 38° C.). In a preferred process, the extruded material includes greater than 60 wt. % inorganic particles and is extruded near ambient conditions.

The devices, apparatuses, systems, and methods according to the teachings herein may be employed with any extruded material. Particular advantages are found when cutting through materials that are in a formable state. The material may be an organic material, an inorganic material, or both. The material may include polymeric material or may be substantially free of polymeric material. The extrudate material (i.e., the extrudate composition) may be a mixture including one or more particulate materials and one or more liquid materials.

A particularly preferred extrudate material is a material that includes, consists essentially of, or consists entirely of one or more inorganic compounds. For example, the extrudate may include particles of one or more inorganic compounds. The extrudate may include a sufficient amount of one or more binders for holding the particles together, for improving the flow of the material, or both. The binder may include one or more liquids suitable for holding the particles together, suitable for improving the flow of the material, or both. A particularly preferred liquid for the extrudate material is a liquid that includes, consists essentially of, or consists of water, glycol ether or both. Examples of inorganic particles that may be employed include particles including silicon atoms, aluminum atoms, titanium atoms, or any combination thereof. The particles may include or consist of one or more inorganic oxides. For example, the particles may include a silicon oxide, an aluminum oxide, a titanium oxide, or any combination thereof. Particularly preferred inorganic compounds include about 35 atomic % or more oxygen atoms. For example about 35 percent or more of the atoms in the extrudate material may be oxygen atoms. The extrudate material may include one or more clays and one or more binders. If employed, the concentration of the clay preferably is about 20 weight percent or more, more preferably about 40 weight percent or more, based on the total weight of the extrudate material. Preferred inorganic particles have an average size of about 100 μm or less, more preferably about 30 μm or less, even more preferably about 10 μm or less, and most preferably about 5 μm or less. Typically the inorganic particles have an average size of about 0.01 μm or more.

The amount of liquid in the extrudate material may be sufficient so that the extrudate material can be processed through an extruder and through an extruder die at or near ambient temperatures. For example the extrusion temperature, the temperature of the material going through the die, or both may be about 38° C. or less, about 35° C. or less, about 30° C. or less, or about 25° C. or less. The extrusion temperature, the temperature of the material going through the die, or both may be about 5° C. or more, more preferably about 10° C. or more. The extrudate material may be capable of being dried or baked so that the extruded material is no longer formable. For example the extrudate material may be capable of being sintered, debindered, or both.

In order for the extrudate material to be formable, it may include one or more binders. The binder may include, consist essentially of, or consist entirely of one or more low molecular weight fluid. By way of example, the binder may include, consist essentially of, or consist entirely of water, a solvent, a plasticizer, or any combination thereof. The concentration of the low molecular weight fluid should be sufficiently high so that the material is formable. For example, the concentration of the low molecular weight fluid may be about 1% or more, about 2% or more, about 4% or more, about 6% or more, about 8% or more, or about 10% or more. The concentration of low molecular weight fluid preferably is sufficiently low so that the part does not flow without an applied force. For example, the concentration of the low molecular weight fluid may be about 40% or less, about 30% or less, about 25% or less, about 20% or less, based on the total weight of the material.

The extrudate material may be include one or more ceramic precursors. An extruded part including a ceramic precursor may be used for a producing a ceramic filter. For example, the extrudate material may be used for producing a ceramic filter suitable for filtering diesel particles (i.e., a diesel particle filter). The extrudate material including one or more ceramic precursors optionally include: one or more binders, one or more liquid carriers, or both. The ceramic precursors are the reactants or components which when exposed to certain conditions form a ceramic body or part from a formable extrudate part (e.g., a wet ceramic green ware bodies). Any known ceramic precursors may be utilized in the formation of a wet ceramic greenware bodies and ultimately the ceramic filter. Included in ceramic precursors are the precursors utilized to prepare one or more of mullite (such as disclosed in U.S. Pat. Nos. 7,485,594; 6,953,554; 4,948,766 and 5,173,349 all incorporated herein by reference), silicon carbide, cordierite, aluminum titanate, alumina, zirconia, silicon nitride, aluminum nitride, silicon oxynitride, silicon carbonitride, beta spodumene, strontium aluminum silicates, lithium aluminum silicates, and the like. Preferred porous ceramic bodies include mullite, silicon carbide, aluminum titanate, cordierite, and compositions containing ceramind binders and ceramic fibers, mullite or combination thereof. Preferred silicon carbides are described in U.S. Pat. Nos. 6,582,796, 6,869,751B1 and WO Publications EP1142619A1, WO 2002/070106A1. Other suitable porous bodies are described by WO 2004/011386A1, WO 2004/011124A1, US 2004/0020359A1 and WO 2003/051488A1, all incorporated herein by reference. Organic binders useful in this invention include any known materials which render the wet ceramic precursor mixture shapeable. Preferably, the binders are organic materials that decompose or burn at temperatures below the temperature wherein the ceramic precursors react to form ceramic filter segments. Among preferred binders are those described in *Introduction to the Principles of Ceramic Processing*, J. Reed, Wiley Interscience, 1988) incorporated herein by reference. A particularly preferred binder is methyl cellulose (such as METHOCEL A15LV methyl cellulose. The Dow Chemical Co., Midland, Mich.). Liquid carriers include any liquid that facilitates formation of a shapeable wet ceramic mixture. Among preferred liquid carriers (dispersants) are those materials described in *Introduction to the Principles of*

*Ceramic Processing*, J. Reed, Wiley Interscience, 1988). A particularly preferred liquid carrier is water. The mixture useful in preparing wet ceramic greenware bodies may be made by any suitable method such as those known in the art. Examples include ball milling, ribbon blending, vertical screw mixing, V-blending and attrition milling. The mixture may be prepared dry (i.e., in the absence of a liquid carrier) or wet. Where the mixture is prepared in the absence of a liquid carrier, a liquid carrier is added subsequently utilizing any of the methods described in this paragraph.

The mixture of ceramic precursors, optionally binders, and liquid carriers may be shaped by any means known in the art. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988, incorporated herein by reference. In a preferred embodiment the mixture is shaped into the near net shape and size of the ultimate desired ceramic part. Near net shape and size means the size of the wet ceramic greenware body is within 10 percent by volume of the size of the final ceramic filter, and preferably the size and shape is within 5 percent by volume of the size of the final ceramic filter. In a preferred embodiment, the wet ceramic greenware body is shaped such that it can be utilized as a flow through filter. At this stage in the process the wet ceramic greenware body has two opposing faces which are substantially planar. The wet ceramic filter greenware body exhibits a cross sectional shape which is consistent for all planes parallel to the two opposing faces. Preferably, at this stage, all of the flow passages are open to both opposing faces. This allows more efficient removal of liquid carrier.

The devices, systems, and apparatuses according to the teachings herein may be used in a process of moving a part that is in a formable state. The process may include a step of contacting a surface of the part with the vacuum pick-up device. The process generally includes a step of applying a sufficient vacuum from the vacuum pick-up device to a surface of the part so that the part can be lifted and repositioned. The process may include a step of contacting the top surface of an extrudate with the porous layer of the pick-up device. When the part is being moved, it may be in a formable state. The vacuum should be sufficient so that the gravitational force from the mass of the part is overcome by the force of the vacuum. The process may include a step of lifting the part by moving the vacuum pick-up device in the vertical direction. The process may include a step of repositioning a part by lowering the part using the vacuum pick-up device.

The process may be employed for moving an extruded part. For example, it may be desirable to move a formable part from an extrusion process shortly after being extruded. As such, the process may include a step of extruding a material to form an extrudate. The extrudate will generally be cut into parts or workplaces, such as parts having a predetermined length. The process may be characterized by one or any combination of (e.g., all of) the following: the process includes a step of extruding a mixture including a plurality of inorganic materials through a die so that an extrudate is formed; the extrudate has a profile with a plurality of rows of open cells; the extrudate includes, silicon atoms, aluminum atoms, or both; the process includes a step of forming a profile by passing the mixture through a die; the process includes a step of conveying the extrudate away from the die using a conveyor in the extrusion direction; the process includes a step of cutting the extrudate into a predetermined length using an ultrasonic knife, a wire cutter, or both; the extrudate includes clay; the extrudate has three or more rows of open cells including an uppermost row of open cells and a top outer wall above the uppermost row of open cells, wherein the step-of precutting the extrudate includes cutting entirely through the top outer wall so that the uppermost row of open cells is exposed; or the extrudate part has a generally rectangular top surface with a width and length and the second surface of the open cell foam has a width that is greater than the width of the part, and a length that is greater than the length of the part, all of the cells of the part remain open after moving the part.

Figure 1:
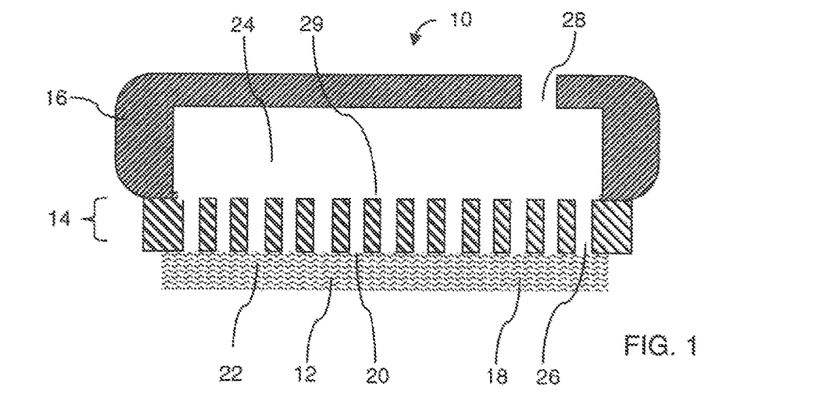
FIG. 1 is a cross-sectional view of an illustrative vacuum pick-up device.

FIG. 1 illustrates features of a vacuum pick-up device 10 according to the teachings herein. FIG. 1 is a partial cross-sectional drawing of the pick-up device through a center of the device. The vacuum pick-up device includes a distributor plate 14 generally interposed between a porous layer 12 and a plenum 16. The porous layer 12 preferably has a first surface 18 for contacting a surface (i.e., the contacting surface) of the part to be moved and an opposing surface 20. The opposing surface 20 of the porous layer 12 may be used for contacting the distributor plate 14. The porous layer 12 generally has a sufficient number of pores 22 so that the opposing surfaces 18, 20 are in fluid communication. The distributor plate 14 preferably is connected to the plenum 16 for creating a vacuum chamber 24. For example, the distributor plate 14 and the plenum 16 may be sealingly connected. The distributor plate 14 preferably has a sufficient number of openings 26 and are sufficiently open so that the vacuum from the vacuum chamber 24 is distributed over the contacting surface of the part, is distributed throughout the pores 18 of the porous layer 12, or both. The plenum 16 may include one or more vacuum receiving openings 28 for connecting to a vacuum source.

Figure 2A:
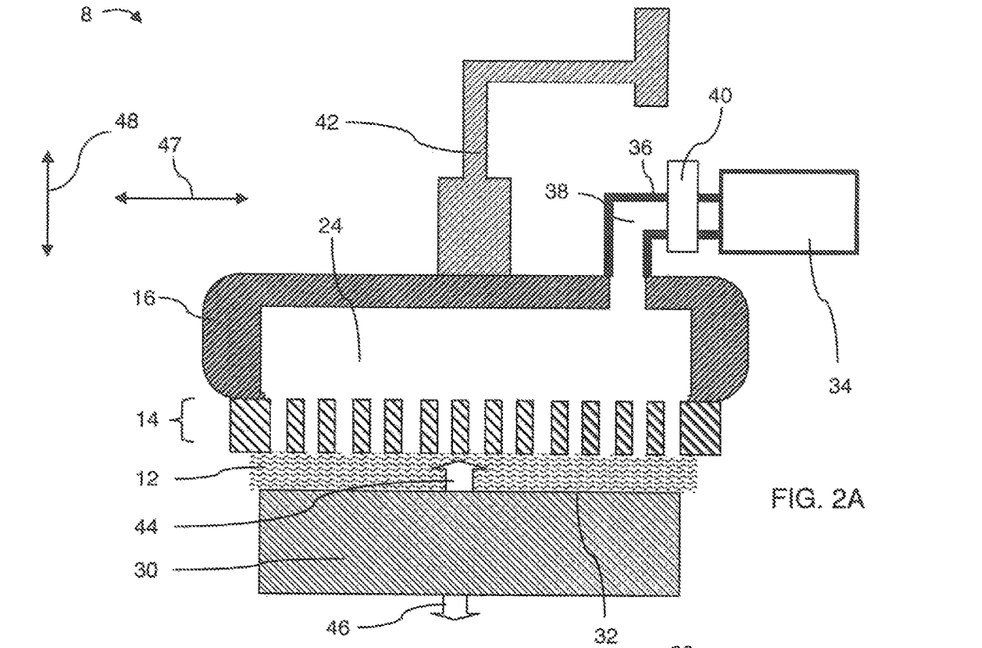
FIG. 2A is a drawing of an illustrative formable part picked up by an apparatus having a vacuum pick-up device (shown in cross-sectional view) connected to a vacuum source using a vacuum line.

The vacuum pick-up device 10 may be used in an apparatus for picking up a part that is in a formable state. With reference to FIG. 2A, the apparatus 8 may include a vacuum pick device 10 according to the teachings herein, one or more vacuum sources 34, and one or more vacuum lines 36. FIG. 2A is a partial cross-sectional view of an apparatus. The vacuum line 36 preferably includes a passage 38 for providing a fluid communication between the vacuum source 34 and the vacuum chamber 24. The apparatus 8 may include a valve 40 for controlling the level of vacuum in the vacuum chamber 24. If employed, the valve 40 may be located anywhere between the vacuum source 34 and the vacuum chamber 24 of the plenum 16.

The apparatus 8 may include one or more movement devices 42 suitable for moving the vacuum pick-up device. The movement device 42 may be capable of moving the vacuum pick-up device in any direction. For example, the movement device 42 may be capable of movement in a vertical direction 48, and/or in one or more horizontal directions 47.

With reference to FIG. 2A, the apparatus may be employed in picking up a formable part 30 having a surface 32 suitable for contacting with the vacuum pick-up device 10. The formable part 30 may be picked up solely by the vacuum forces 44 exerted on the surface 32 of the part that contacts the porous layer 12 of the vacuum pick-up device. As such, the vacuum forces 44 may be greater than the gravitational force 46 due to the mass of the part 30.

Figure 2B:
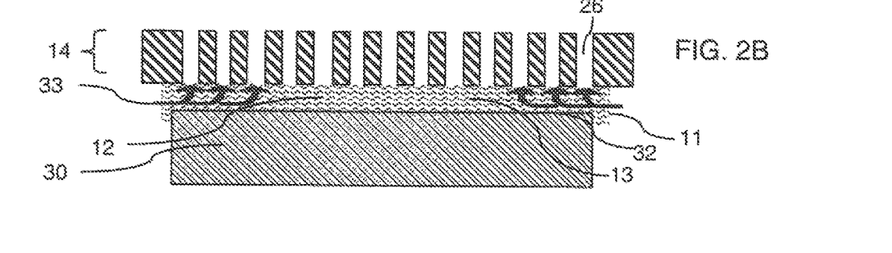
FIG. 2B is an illustrative cross-sectional view drawing showing features that may be employed in a vacuum pickup device.

FIG. 2B is an illustrative partial cross-sectional view through of a porous layer 12, a formable part 30, and a distributor plate 14. The porous layer 12 is positioned between the formable part 30 and the distributor plate 14 while the formable part 30 is being moved-using a vacuum. As illustrated in FIG. 2B, the porous layer 12 may have a deformed region 13 that is deformed by the vacuum force acting on the part. Preferably, the thickness of the porous layer 12 may be reduced in the central region 13 compared with the thickness of the porous layer 12 when it is not in contact with a formable part. The porous layer 12 may have a periphery region 11. The periphery region preferably is not compressed by the formable part. As such, when moving the part, the porous layer, may be characterized as having a periphery region 11 that is thicker than the porous layer in a central region 13. While moving the formable part, the porous layer preferably is sufficiently porous so that air cart flow from outside the device, through at least a portion of the porous layer and through at least one of the openings 26 in the distributor plate 14. As such, the porous layer may allow for limited leakage of air into the vacuum chamber 24. Such leakage of air into the vacuum chamber 24 may reduce the level of vacuum in the vacuum chamber 24 so that the deformation of the deformable part is reduced or eliminated.

Figure 3:
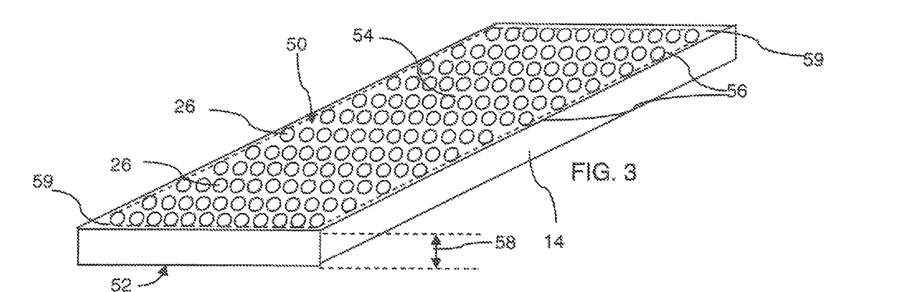
FIG. 3 is a schematic drawing of an illustrative distributor plate.

Illustrative features of a distributor plate 14 are shown in FIG. 3. The distributor plate may have a first surface 50 that faces a part, and an opposing second surface 52 that faces away from the part. The second surface 52 may face towards the plenum, face towards the vacuum chamber formed by the distributor plate and the plenum, or both. The openings 26 in the distributor plate generally extend from the first surface 50 to the second surface 52. The size of any opening 26 at the first surface 50 may be smaller than, the same size as, or greater than the opening at the second surface 52. The distributor plate 14 preferably has one or more opening regions 54 including openings 26 distributed throughout the region. For example all of the openings 16 may be in a single opening region 54 that is generally contiguous. With reference to FIG. 3, the distributor plate 14 may include one or more generally solid regions 56 that are generally free of openings for providing a fluid communication with the vacuum chamber. Preferably, one or more of (e.g., all of) the generally solid regions, are positioned along the external periphery 59 of the surface. The distributor plate may be characterized by a thickness 58 that may be uniform or may vary. Preferably, the distributor plate has a sufficient thickness 58 so that it does not deform when the part is picked up using a vacuum. As illustrated in FIG. 3, some or all of the openings 26 in the distributor plate may be characterized as being evenly spaced, distributed over an entire region, or both. For example, the openings may be arranged in a two-dimensional array. The openings 26 may be generally circular. However, other shaped openings may be used.

Figure 4A:
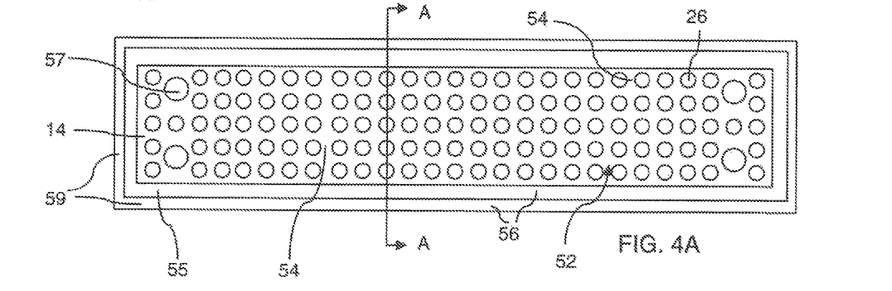
FIG. 4A is a top view of an illustrative distributor plate.
Figure 4B:
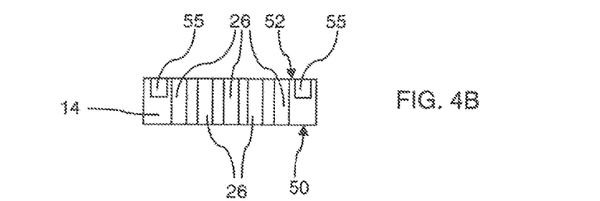
FIG. 4B is a cross-sectional view illustrating features of the distributor plate of FIG. 4A.

FIG. 4A is a top view of an illustrative distributor plate 14 having features according to the teachings herein. With reference to FIG. 4A, the distributor plate may include a plurality of openings 26 for providing a fluid connection between a vacuum chamber and a porous layer, one or more connection features 57, and a solid region 56 that is generally free of the openings 26. The distributor plate 14 may include one or more sealing features for reducing or eliminating leakage between the distributor plate 14 and the plenum. For example, the distributor plate may include one or more channels channel (e.g., a groove) 55. The channel 55 may be suitable for receiving a portion of a wall of a plenum, for receiving a sealing material, or both. With reference to FIG. 4A, the distributor plate may include one or more connection features 57. The connection feature may be employed for connecting the distributor plate to another component, such as to a plenum. The connection feature may be sized, or otherwise configured for receiving a screw, a bolt, or other fastener. The connection feature 57 may include a hole that extends partly or entirely through the plate. The connection may include a hole that is threaded or unthreaded. Any connection feature preferably is positioned and designed so that when used with a fastener for connecting the distributor plate, the connection feature and the fastener do not contact the formable part being moved. The distributor plate should be sufficiently rigid so that the surfaces of the distributor plate 50, 52 maintain a generally constant shape during use. FIG. 4B is an illustrative cross-sectional view of the distributor plate of FIG. 4A taken along the line A-A. The hidden lines (e.g., for the connection features 57) are not shown in this cross-sectional view. As illustrated in FIG. 4B, the openings 26 may extend from between the two surfaces 50, 52 of the plate 14. The channel, if present, preferably does not extend to the first surface 50 of the distributor plate.

Figure 5:
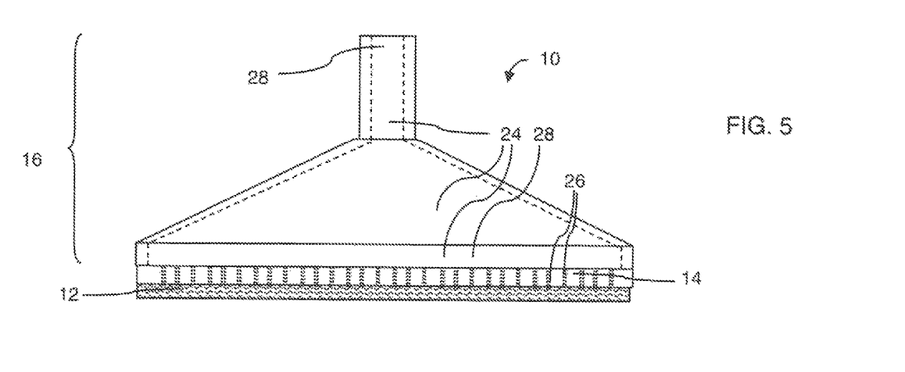
FIG. 5 is a front view of an illustrative vacuum pick-up device.

FIG. 5 is a schematic drawing of an illustrative pick-up device 10. With reference to FIG. 5, the pick-up device may include showing a porous layer 12, a distributor plate 14, and a plenum 16. The plenum may have a receiving opening 28 and a dispensing opening 29. The receiving opening 28 preferably is relatively small compared to the dispensing opening 29. The distributor plate 14 has a sufficient number of openings 26 that so that the vacuum from the vacuum chamber 24 is distributed over the porous layer 12.

Figure 6A:
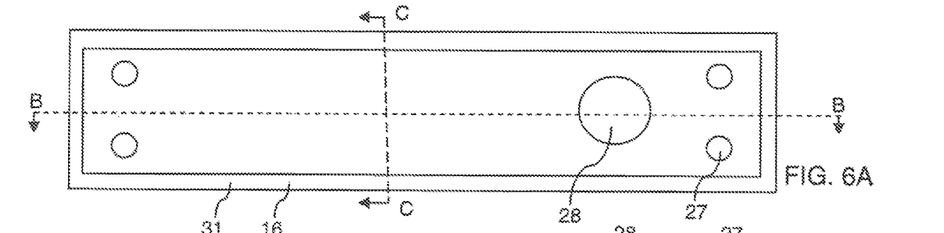
FIG. 6A is a bottom view of an illustrative plenum.
Figures 6B, 6C:
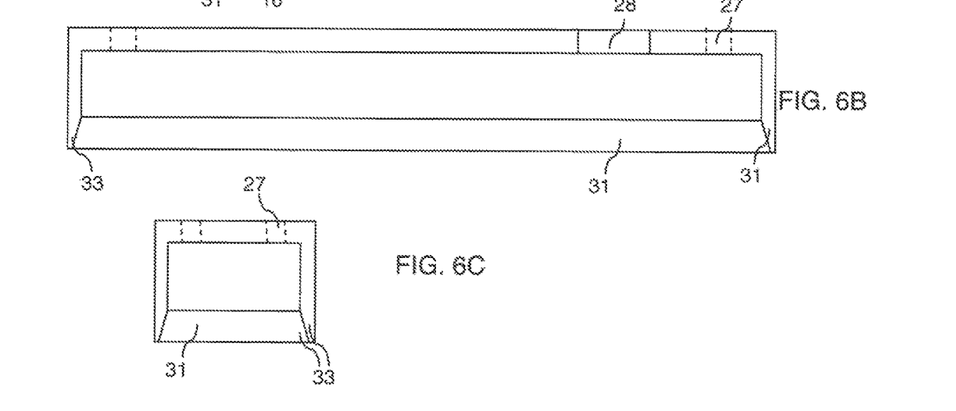
FIG. 6B is an illustrative cross-sectional view of the plenum of FIG. 6A.
FIG. 6C is another illustrative cross-sectional view of the plenum of FIG. 6A.

FIGS. 6A, 6B, and 6C are drawings of an illustrative plenum 16. FIG. 6A is a bottom to top view drawing of the plenum. FIG. 6B is a cross-sectional view of the plenum taken from line B-B of FIG. 6A. FIG. 6C is a cross-sectional view of the plenum taken from line C-C of FIG. 6A. With reference to FIGS. 6A, 6B, and 6C, the plenum may include one or more securing features 27 for securing the plenum to a distributor plate, for securing the plenum to a moving device, or both. The plenum may include one or more wall portions 31 suitable for fitting into a channel or groove of a distributor plate. The wall portion 31 may include an inclined edge 33 or otherwise beveled edge that facilitates the fitting of the wall portion into a channel of the distributor plate. For example the wall portion 31 may include a chamfer.

Figure 7:
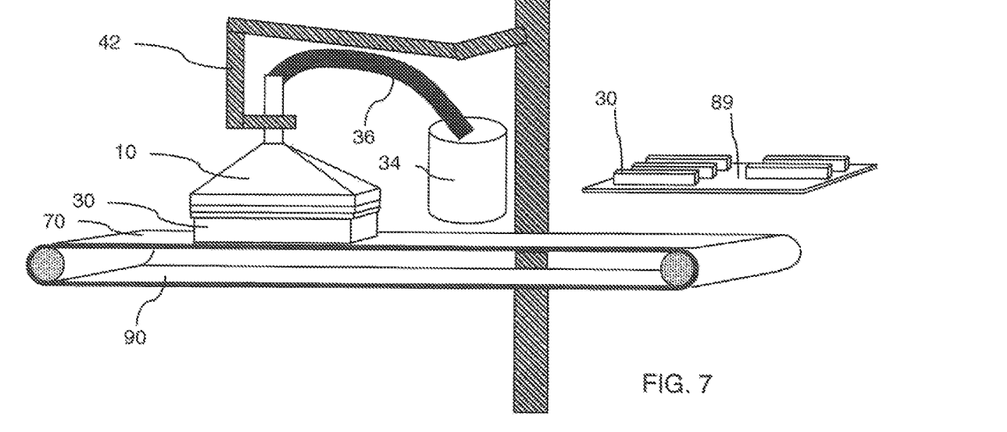
FIG. 7 is a drawing showing illustrative features of a system for moving a part that is in a formable state.

FIG. 7 is a schematic drawing illustrating features of system for moving a formable part 30 according to the teachings herein. With reference to FIG. 7, the part 30 to be moved may be initially supported on a substrata 70. The substrate 70 may be a moving substrate, such as a conveyor belt 90. The system may include a vacuum pick-up device 10 that is in fluid connection with a vacuum source 34. The fluid connection may be provided by one or more vacuum lines 36. The system may include a movement device 42 suitable for moving the part 30 from the substrate 70 to a desired location 89. The vacuum pick-up device generally includes a vacuum chamber. When the part is being picked-up and moved, the vacuum in the vacuum chamber of the vacuum pick-up device is sufficiently high so that the part can be picked up. After the part 30 is positioned in the desired location 89, the level of vacuum in the vacuum chamber may be reduced so that the vacuum pick-up device 10 can move away from the part 30. The system may include a vacuum regulator or valve (not shown) for controlling the vacuum in the vacuum chamber of the vacuum pick-up device. The system preferably include one or more component (not shown) for reducing the level of vacuum in the vacuum chamber of the vacuum pick-up device so that the vacuum pick-up device 10 can move away from the part 30 after the part is positioned in a desired location 89.

Figure 8:
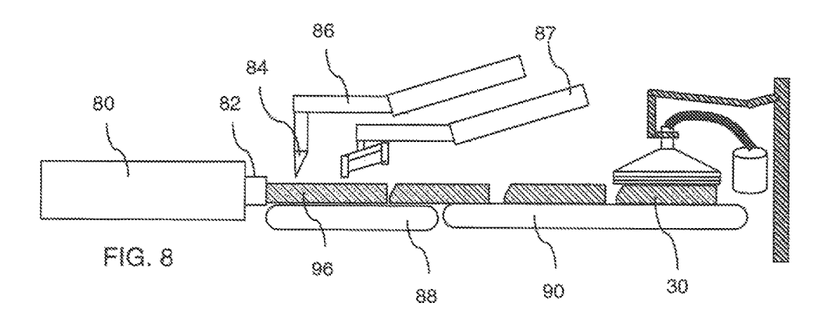
FIG. 8 is a drawing showing illustrative features of a system for moving a part that is in a formable state.

FIG. 8 illustrates features of a system according to the teachings herein. The system may include an extruder 80 and a die 82 for forming an extrudate 96. The system may include one or more cutting devices 88, 87 for cutting the extrudate into parts 30. For example, the system may include a cutting device including a knife 84, such as an ultrasonic knife for at least partially cutting through the thickness of the extrudate. As another example, the system may include a cutting device 87 including a wire cutter. In a particularly preferred system, the system includes both an ultrasonic knife and a wire cutter. For example, the ultrasonic knife may be used for making a precut into the part and the wire cutter may be employed for completing the cut through the cross-section of the part.

Figures 9, 10:
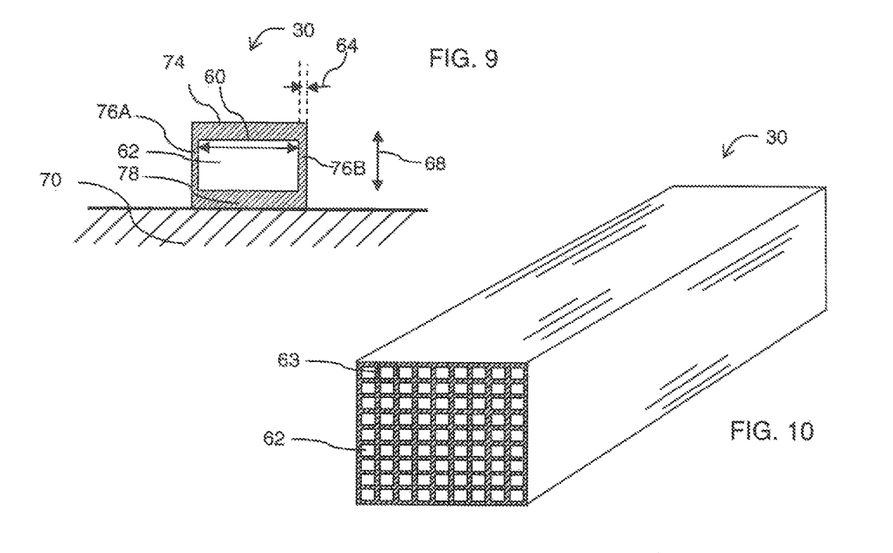
FIG. 9 is a cross-sectional view of a formable part having one or more cells.
FIG. 10 is a perspective view of a formable part, such as an extruded part, having a profile that includes a plurality of rows of cells, a plurality of columns of cells, or both.
Figure 11:
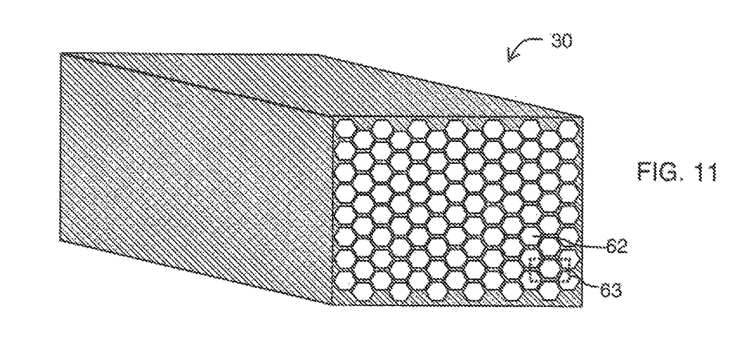

FIG. 9 is an illustrative drawing of a cross-section of an extruded part 30 in the transverse direction showing features of an extrudate profile that may be used according to the teachings herein. Examples of parts having 2 or more cells are illustrated in FIGS. 10 and 11. FIG. 10 is a perspective view of an illustrative part 30 having a generally planar top surface. FIG. 11 is a perspective view of another illustrative part 30 having a generally planar top surface. The parts 30 may include one or any combination of the features illustrated in these figures. The extruded part 30 may be supported by a substrate 70, such as a conveyor belt. The extruded part may have an opening 62 and a plurality of walls, 74, 76A, 76B, and 78, that surround the opening 62. The direction 68 of initial movement of the part by a pick-up device may be in the thickness direction of one of the walls, such as a fop wall 74. The part may be moved by contacting a vacuum pick-up device to an outer surface of a wall. Preferably, the vacuum pick-up device contacts the top wall 74 of the part. The top wall 74 may be supported by one or more walls support walls 76A, 76B. The width 60 of the top wall 74 may be generally large, the thickness 64 of a support wall may be generally low, or both, so that particular care must be taken to prevent collapse of the opening when contacting the part with the pick-up device, when applying a vacuum to the surface of the top wall 74, and when moving the part. When the part includes a plurality of cells, the cells may be arranged in a regular pattern, such as shown in FIGS. 10 and 11, or may be irregularly arranged. For example, the cells may be arranged in an array including one or more rows, and one or more columns. The number of rows preferably is 2 or more, 4 or more, or 7 or more. The number of columns preferably is 2 or more, 4 or more, or 7 or more. The repeating pattern may include any number of cells. For example, FIG. 10 illustrates a repeating pattern 63 with 1 cell, and the cross section in FIG. 11 illustrates a repeating pattern 63 with 2 cells. A cell in a part having a plurality of cells, such as illustrated in FIG. 10 or 11, may include one or any combination of the features illustrated in FIG. 9. The extrudate structure may be a generally honeycomb structure such as the structure having generally hexagonally shaped cells as illustrated in FIG. 11. The extrudate structure may have an array of generally rectangular or square shaped cells, such as illustrated in FIG. 10. It will be appreciated that the spacing between cells preferably is generally uniform. However, irregularly spaced cells may are also contemplated and within the teachings herein.

Example 1

A material including a mixture of inorganic particles and a binder is extruded at room temperature. The material passes through a die to produce a profile including about 1938 generally square cells arranged in an array of about 44 rows by about 44 columns. The profile has a height of about 80 mm and a width of about 80.2 mm. The tolerance for the part height is about ±4 mm. The extrudate is conveyed on a conveyor at a constant speed. The extrudate is first pre-cut using an ultrasonic knife. The ultrasonic knife travels at a speed synchronous with or greater than the speed of the extrudate. The ultrasonic knife makes a pre-cut through only the top 1-4 rows of cells and then the ultrasonic knife is removed. The cut through the remainder of the cross-section is made using a wire cutter that travels away from the extruder synchronously with the extrudate. None of the cells become blocked or sealed and no vacuum is formed. The extrudate maintains its height within about 1 mm. The extruded part has a length of about 253 mm and weight about 1240 grams.

While the extruded part is conveyed on a convey and still in a formable state, the part is moved using a pair of spaced apart parallel vertical plates. Sufficient force is applied to the part to prevent it from slipping out while the part is lifted off of the conveyor. The part is moved by lifted the part vertically and then moving the part to a storage table. When the part is released on the storage fable its width has changed by about 6% or more and/or the part has marks from the plates. Upon repeating the process with similarly extruded parts, a large variability in the appearance and shape of the final part, is observed despite high uniformity of the part dimensions after being extruded and cut to length.

Example 2

The process of example 1 is repeated for making the extruded part having the length of about 253 mm. In example 2, the part is moved using a traditional vacuum sealing device. The sealed vacuum sealing device seals a region on the top surface of the part. The area of the part that is in the sealed region is about 400 mm$^2$. A sufficient vacuum is applied to this sealed region so that the part can be lifted without separating from the vacuum sealing device. The part is lifted vertically using the vacuum sealing device and moved to the storage table. After placing the part on the storage table, the vacuum is released and the device is removed from the part. There are markings on the top surface of the part showing the location where the part was sealed. The surface of the part has a contour in the region that was sealed and is no longer planar. The part is no longer within the required tolerances Example 3

The process of example 1 is repeated for making the extruded part having the length of about 253 mm. In example 3, the part is moved using a vacuum pick-up device that includes a plenum and a distributor plate having a plurality of openings. The vacuum pick-up device does not include a porous layer. The distributor plate contacts the top surface of the part. Because of the length of the part and the rigidity of the distributor plate, the plate does not contact the part at the same time and the forces on the part are not uniform. A sufficient vacuum is applied to the part through the openings in the distributor plate to lift the part. The part is lifted vertically and moved to the storage table. After positioning the part on the storage table the vacuum is released and the device is removed from the part. The top surface of the part has markings indicating regions where the plate first contacted the part. The top surface of the part has markings where material from the part partially flowed or bowed into the openings of the distributor plate.

Example 4

The process of example 1 is repeated for making the extruded part having the length of about 253 mm. In example 4, the part is moved using a vacuum pick-up device that includes a plenum and a distributor plate having a plurality of openings, and a porous foam layer below the distributor plate. The porous foam layer contacts the top surface of the part. Regions of the porous layer that contact the part first become compressed without leaving any markings on the part. The porous foam layer extends over the top surface of the part by about 1 mm or more on each side. A vacuum is applied which causes the part to compress the porous foam layer. The vacuum is sufficient to lift the part and is distributed uniformly over the top surface of the part. The part is lifted vertically and moved to the storage area. While the part is being moved, air flows through the edges of the foam that overlap the part and into the vacuum chamber of the vacuum pick-up device. After positioning the part in the storage area, the vacuum is reduced and the vacuum pick-up device is moved away from the part. The surface of the part after moving has the same shape and appearance as it had prior to moving the part.

What is claimed is:

1. A device for picking up a part having a planar top surface and in a formable state comprising:
    a vacuum pickup tool including:
        a plenum having one or more first openings for providing a fluid communication with the vacuum via a vacuum line, and a second opening for spreading the vacuum over a surface of the part, wherein the second opening is large relative to the one or more first openings;
        a distributor plate sufficiently large for covering the relatively large opening of the plenum for forming a vacuum chamber in the space between the plenum and the distributor plate, wherein the distributor plate has opposing first and second surfaces wherein the first surface faces the plenum, the second surface faces away from the plenum, wherein the second surface is generally planar, and the distributor plate has a region with a plurality of suction openings that each provides a fluid communication between the first surface and the second surface of the distributor plate for picking-up the part; and
        a porous layer having opposing first and second surfaces, wherein the porous layer is sufficiently large so that its first surface substantially or entirely covers the plurality of suction openings of the distributor plate; wherein the porous layer includes an open cell foam which is sufficiently porous so that the second surface of the porous layer and the vacuum are in fluid communication;
    wherein the device is capable of picking up the part in the formable state; and the second surface of the distributor plate faces the porous layer;
    wherein only the porous layer of the vacuum pickup tool is capable of contacting the part.

2. The device of claim 1, wherein the second surface of the foam covers the entire top surface of the part.

3. The device of claim 1, wherein the number of the plurality of suction openings in the distributor plate is about 20 or more, and the ratio of the total area of the plurality of suction openings to the total area of the first surface of the distributor plate is from about 0.1 or more to about 0.8.

4. The device of claim 1, wherein the vacuum pickup tool is capable of lifting the part without leaving a witness mark, without distorting the shape of the part, or both.

5. A system comprising:
    i) a device for picking up a part having a planar top surface and in a formable state, wherein the device is a vacuum pick-up device and includes
        a vacuum pickup tool including:
            a plenum having one or more first openings for providing a fluid communication with the vacuum via a vacuum line, and a second opening for spreading the vacuum over a surface of the part, wherein the second opening is large relative to the one or more first openings;
            a distributor plate sufficiently large for covering the relatively large opening of the plenum for forming a vacuum chamber in the space between the plenum and the distributor plate, wherein the distributor plate has opposing first and second surfaces wherein the first surface faces the plenum, the second surface faces away from the plenum, wherein the second surface is generally planar, and the distributor plate has a region with a plurality of suction openings that each provides a fluid communication between the first surface and the second surface of the distributor plate for picking-up the part; and
            a porous layer having opposing first and second surfaces, wherein the porous layer is sufficiently large so that its first surface substantially or entirely covers the plurality of suction openings of the distributor plate; wherein the porous layer includes an open cell foam which is sufficiently porous so that the second surface of the porous layer and the vacuum are in fluid communication;
        wherein the device is capable of picking up the part in the formable state; and the second surface of the distributor plate faces the porous layer;
        wherein only the porous layer of the vacuum pickup tool is capable of contacting the part;
    ii) a conveyor for moving the part to be lifted in a generally horizontal direction, and
    iii) a movement device for initially moving the vacuum pick-up tool synchronously with the conveyor while contacting the foam with the part.

6. The system of claim 5, wherein the movement device is capable of moving vertical to lift the part; moving faster than the conveyor in the horizontal direction while lifting the part; or both.

7. The system of claim 5, wherein the apparatus includes a valve or switch for controlling or otherwise regulating the level of vacuum in the plenum.

8. The system of claim 5, wherein the movement device is capable of moving the part from the conveyor to a predetermined location wherein each dimension of the part changes by about 4% or less while the part is moved.

9. The system of claim 5, wherein the distributor plate is sufficiently rigid and the vacuum is sufficiently strong so that the device can lift up a formable part having a generally flat top surface and an interior with a plurality of elongated cells, substantially without changing the shape of the part.

10. A process for moving an extrudate comprising:
    i) a step of contacting a planar top surface of an extrudate with porous layer a device, while the part is on a substrate and in a formable state, wherein
    the device has a vacuum pickup tool including:
        a plenum having one or more first openings for providing a fluid communication with the vacuum via a vacuum line, and a second opening for spreading the vacuum over a surface of the part, wherein the second opening is large relative to the one or more first openings;

a distributor plate sufficiently large for covering the relatively large opening of the plenum for forming a vacuum chamber in the space between the plenum and the distributor plate, wherein the distributor plate has opposing first and second surfaces wherein the first surface faces the plenum, the second surface faces away from the plenum, wherein the second surface is generally planar, and the distributor plate has a region with a plurality of suction openings that each provides a fluid communication between the first surface and the second surface of the distributor plate for picking-up the part; and a porous layer having opposing first and second surfaces, wherein the porous layer is sufficiently large so that its first surface substantially or entirely covers the plurality of suction openings of the distributor plate; wherein the porous layer includes an open cell foam which is sufficiently porous so that the second surface of the porous layer and the vacuum are in fluid communication;

wherein the second surface of the distributor plate faces the porous layer;

wherein only the porous layer of the vacuum pickup tool contacts the part;

ii) applying a sufficient vacuum to the plenum so that the gravitational force from the mass of the part is overcome by the upward force of the vacuum; and iii) lifting the part by moving the device away from the substrate.

11. The process of claim 10, wherein the process includes one or any combination of the following features:
  i. the process includes a step of extruding a mixture including one or more inorganic compounds through an extruder; or
  ii. the process includes a step of forming a profile by passing the mixture through a die; or
  iii. the process includes a step of conveying the extrudate away from the die using a conveyor in the extrusion direction; or
  iv. the process includes a step of cutting the extrudate into a predetermined length using an ultrasonic knife, a wire cutter, or both; or
  v. the extrudate includes clay; or
  vi. the extrudate has three or more rows of open cells including an uppermost row of open cells and a top outer wall above the uppermost row of open cells, wherein the step of precutting the extrudate includes cutting entirely through the top outer wall so that the uppermost row of open cells is exposed.

12. The process of claim 11, where the process includes i, ii, iii, iv, v, and vi.

13. The process of claim 10, wherein the extrudate part has a generally rectangular top surface with a width and length and the second surface of the open cell foam has a width that is greater than the width of the part, and a length that is greater than the length of the part.

14. The process of claim 10, wherein all of the cells of the part remain open after moving the part.

15. The device of claim 1,
wherein the distributor plate is sufficiently rigid and the vacuum is sufficiently strong so that the device can lift up a formable part having a generally flat top surface and an interior with a plurality of elongated cells, substantially without changing the shape of the part.

16. The device of claim 1, wherein
the second surface of the foam covers the entire top surface of the part;
the distributor plate has about 20 or more suction openings, and the ratio of the total area of the plurality of suction openings to the total area of the first surface of the distributor plate is from about 0.1 or more to about 0.8; and
the device is capable of lifting the part without leaving a witness mark, without distorting the shape of the part, or both.

17. A process for moving an extrudate with the system of claim 5, the process comprising:
a step of contacting the top surface of an extrudate with the porous layer of the vacuum pick-up device while the part is on a substrate;
applying a sufficient vacuum to the plenum so that the gravitational force from the mass of the part is overcome by the upward force of the vacuum; and
lifting the part by moving the vacuum pick-up device away from the substrate.

18. A device for picking up a part in a formable state comprising:
a vacuum pickup tool including:
  a plenum having one or more first openings for providing a fluid communication with the vacuum via a vacuum line, and a second opening for spreading the vacuum over a surface of the part, wherein the second opening is large relative to the one or more first openings;
  a distributor plate sufficiently large for covering the relatively lame opening of the plenum for forming a vacuum chamber in the space between the plenum and the distributor plate, wherein the distributor plate has opposing first and second surfaces wherein the first surface faces the plenum, the second surface faces away from the plenum, wherein the second surface is generally planar, and the distributor plate has a region with a plurality of suction openings that each provides a fluid communication between the first surface and the second surface of the distributor plate for picking-up the part; and
  a porous layer having opposing first and second surfaces, wherein the porous layer is sufficiently large so that its first surface substantially or entirely covers the plurality of suction openings of the distributor plate; wherein the porous layer includes an open cell foam which is sufficiently porous so that the second surface of the porous layer and the vacuum are in fluid communication;
wherein the device is capable of picking up the part in the formable state; and the second surface of the distributor plate faces the porous layer;
wherein the porous layer is arranged so that it is capable of being compressed upon picking up the part.

* * * * *